United States Patent [19]

Seit

[11] 4,422,696
[45] Dec. 27, 1983

[54] TRACK STRUCTURE FOR A TRACKED VEHICLE

[75] Inventor: Horst Seit, Steinbach, Fed. Rep. of Germany

[73] Assignee: Krauss-Maffei Aktiengesellschaft, Munich, Fed. Rep. of Germany

[21] Appl. No.: 200,381

[22] Filed: Oct. 24, 1980

[30] Foreign Application Priority Data

Oct. 25, 1979 [DE] Fed. Rep. of Germany ....... 2943066

[51] Int. Cl.³ ............................................. B62D 55/14
[52] U.S. Cl. .................................................... 305/28
[58] Field of Search ....................... 305/28, 25, 24, 21, 305/27, 56; 474/134, 137

[56] References Cited

U.S. PATENT DOCUMENTS 1,926,244  9/1933  Sargent ............................. 305/24 X

FOREIGN PATENT DOCUMENTS 659477  3/1938  Fed. Rep. of Germany .
761988  6/1954  Fed. Rep. of Germany .
146660  7/1961  U.S.S.R. ................................. 305/56
402488  3/1974  U.S.S.R. ................................. 305/56

OTHER PUBLICATIONS

*Principles of Automotive Vehicles*, pp. 399–401, U.S. Government Printing Office, Washington, DC Jan. 1956.

*Primary Examiner*—Charles A. Marmor
*Attorney, Agent, or Firm*—Karl F. Ross; Herbert Dubno

[57] ABSTRACT

A track structure for a tracked vehicle especially a tank, comprises a track whose tread links are joined in the continuous chain by intermediate links such that the tread links have a spacing x from one another. The tread chain passes around running-wheel assemblies supporting the chassis of the vehicle, each assembly having a pair of rollers journaled adjacent one another at horizontally spaced axes such that the spacing X of the two rollers of each assembly from one another is equal to 1x to 1.5x, inclusive. This reduces shock transmission to the vehicle as the flat links pass around the roller assemblies.

5 Claims, 5 Drawing Figures

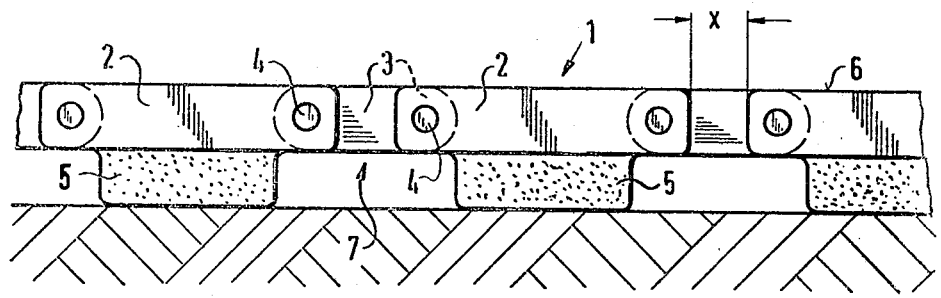
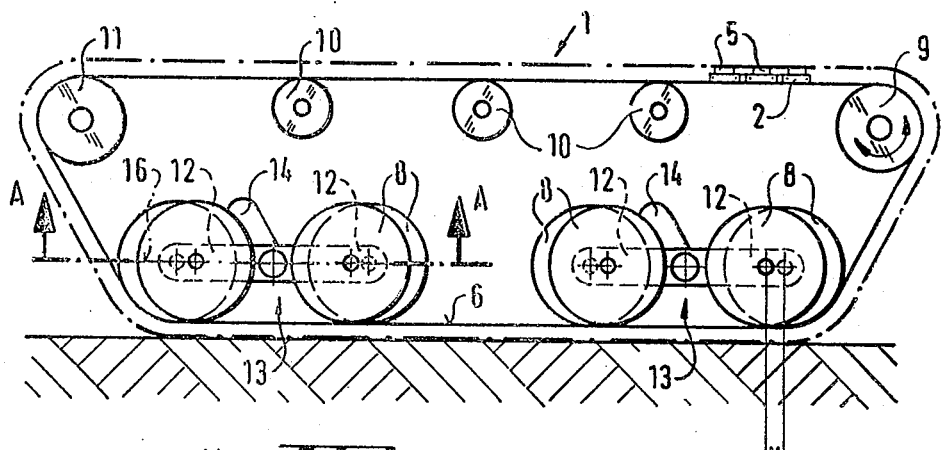
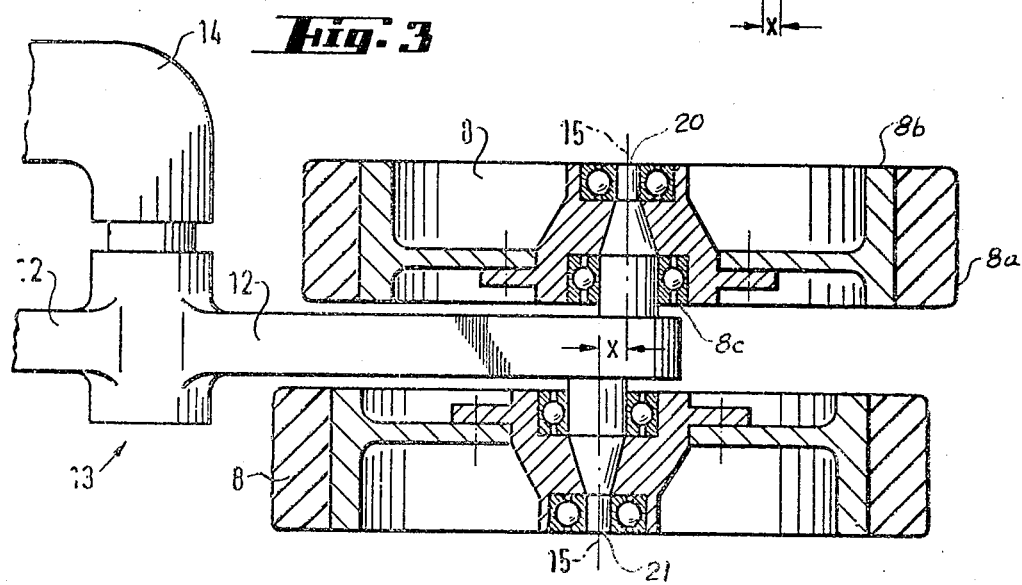

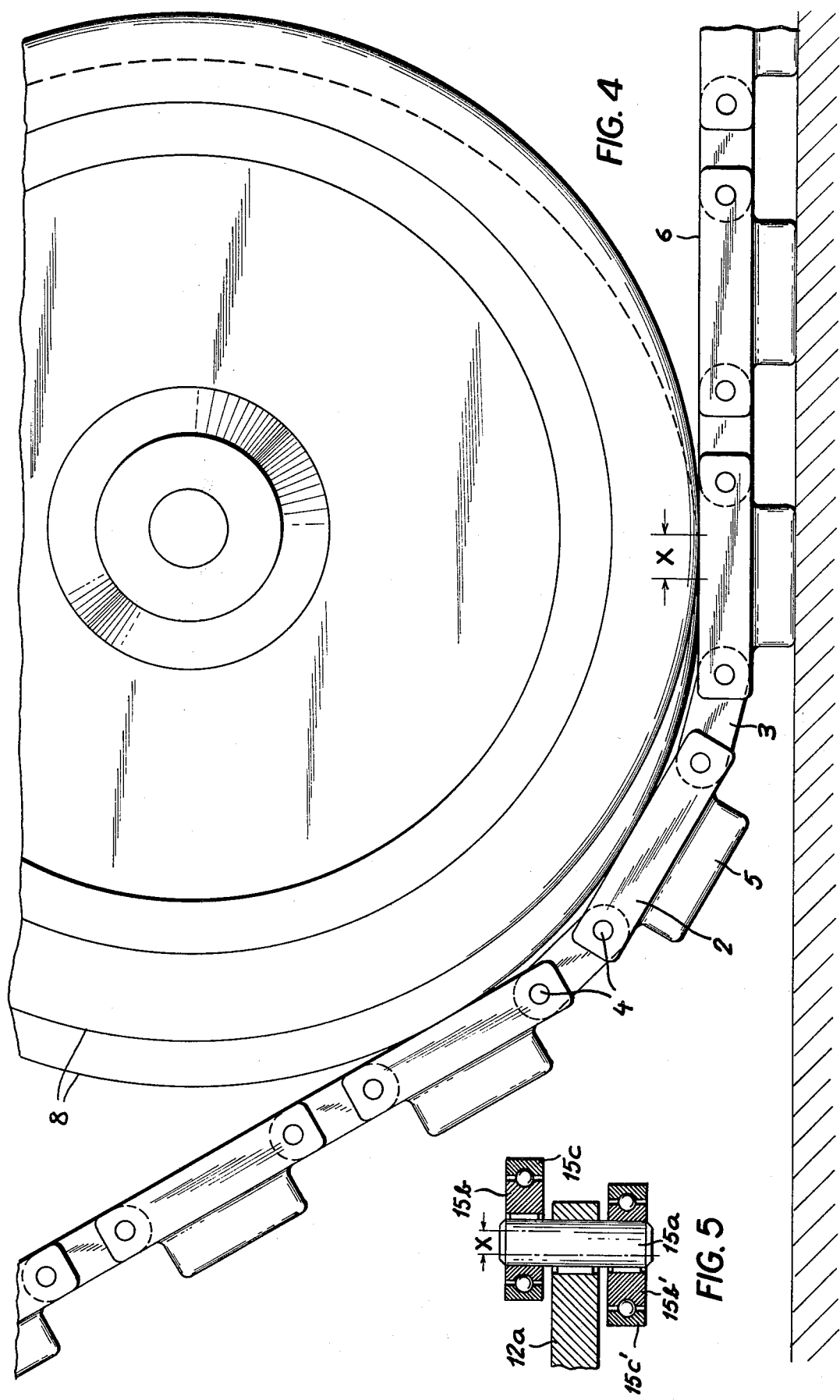

TRACK STRUCTURE FOR A TRACKED VEHICLE

FIELD OF THE INVENTION

My present invention relates to track systems for land vehicles and, more particularly, to a track structure for heavy tracked vehicles such as military vehicles, especially tanks.

BACKGROUND OF THE INVENTION

A tracked vehicle, especially military vehicles such as tanks, generally comprises on each side of the vehicle, a respective track structure comprising an endless track chain, various rollers, sprockets or wheels over which the chain is guided.

The lower pass of the tread chain is held against the ground by at least two running-wheel assemblies and at each end of the lower pass, the chain extends upwardly at an obtuse angle to the lower pass and then around other rollers to form the upper pass of the tread chain.

Generally the chain comprises a multiplicity of tread bars provided with the ground-engaging treads which lie on the outside of the continuous tread chain, and intermediate links which are hingedly connected to each of these bars join them to the next bar of the chain.

Between the tread bars or links, therefore, a gap is formed.

The running-wheel assemblies can comprise a wheel at each end of the lower pass about which the chain runs and which is mounted on a support arm connected to the chassis, usually pivotally, and transmitting force to the chassis via a spring and shock-absorber suspension. In some assemblies, the running wheels or rollers are provided in pairs to either side of a fulcrum arm. Thus each pair of wheels of a given roller assembly includes one wheel or roller about which the chain passes at a respective end of the lower stretch, and another wheel inwardly of the first-mentioned wheel which rests upon the lower tread.

The surfaces which engage these wheels are formed by the tread bars or links and hence the running surface of the chain on the wheels is interrupted since a gap is provided between each tread bar and the next. The connecting links may be disposed outwardly of the lateral surfaces of the wheels so that they are never engaged thereby.

A typical system for bogie and track assemblies for track-laying vehicles of the above-described type can be found at pages 399 to 401, in the publication entitled, *Principles of Automotive Vehicles*, U.S. Government Printing Office, Washington, D.C. January 1956. Reference is also made to German Pat. Nos. 761,988 and 659,477.

Since the road wheels or running wheels of the track assembly have, at best, line contact on the running surface of the chain links, between these links the wheels tend to drop as the links pass around the wheels. This tends to impart a vertical displacement to the wheel axis and is translated into vertical oscillation of high-energy content of a frequency which is a function of the track speed and the space between the tread links.

While these vertical oscillations are generally taken up by the shock absorber and damper systems of the suspension, a severe stress is placed upon the latter when the track-laying vehicle travels over irregular terrain and even when the vehicle negotiates perfectly level surfaces.

The wear and tear on the suspension is thus pronounced, maintenance costs are high and frequently a vehicle may have to be taken out of service for such maintenance at an inopportune moment. It is, therefore, important to avoid the generation of these vertical oscillations which have been considered inherent in the nature of rigid-link track chains and running-wheel assemblies.

OBJECTS OF THE INVENTION

It is the principal object of the present invention to provide an improved track assembly for a track-laying vehicle whereby the aforedescribed disadvantages of earlier systems are obviated.

Another object of the invention is to provide a track assembly for a military vehicle such as a tank, which tends to impart less energetic shocks to the suspension and the vehicle chassis than earlier arrangements.

It is yet another object of the invention to minimize the vertical oscillations generated by passage of a rigid-link tread chain about the road or running wheels or rollers of a tank or like track-laying vehicle.

SUMMARY OF THE INVENTION

These objects and others which will become apparent hereinafter are attained, in accordance with the present invention in a track assembly for a track-laying vehicle, especially a tank, in which the continuous or endless tread chain comprises a plurality of tread bars or links which are spaced apart but hingedly connected together, the spacing between these links being x, and running-roller assemblies at least at each end of the lower stretch of this chain, each assembly comprising a support arm pivotally mounted on the chassis and, at least at one end of this arm a pair of running wheels of equal diameter engaging the chain and having an interaxial spacing X in a plane parallel to the lower stretch (for convenience here referred to as a horizontal plane) such that $1x \leq X \leq 1.5x$.

Thus the interaxial offset of these two rollers journaled independently on a common end of the respective arm ensures that one of the rollers will be in line contact with a leading tread link while the other is in line contact with an immediately following tread link at all times as the chain passes over or around this pair of rollers. The interaxial offset is at least equal to the spacing of the tread links and can be up to 1.5 times this spacing.

The pair of rollers of the present invention ensure that upon passage of the tread chain thereover, the pair of rollers will not drop and hence the end of the arm carrying this pair of rollers will not undergo vertical oscillation as has hitherto been considered practically inevitable with rigid-link tread chains. This is because at least one of the rollers at each end of the arm is always in contact with a flat portion of the running surface of a tread bar.

I found further that the system of the invention has an additional advantage, namely, that the tread links are no longer bent under pressure from the running wheels as has been found to be common in the past when the links had rubber treads or cushions and which tended to increase the oscillation effect mentioned earlier.

Surprisingly, the plane of the axes of the pair of running rollers remains parallel to the running surface of the tread and thus effective track is provided at all times and force transmission can be ensured in a particularly effective manner.

According to another feature of the invention, two such arms are interconnected to form a rocker which is fulcrumed centrally to the vehicle chassis, e.g. by a carrier in the form of a crank arm.

It has been found to be advantageous to mount the axis of the wheels of each pair in a crank shaft-like offset manner upon the respective arm so that the axes of the two wheels project to opposite sides of the arm and the wheels are cantilevered thereon.

It is also advantageous to provide the axes in the form of a throughgoing cylindrical pin which traverses the arm and upon which respective eccentric pieces are fitted so as to be nonrotatable.

BRIEF DESCRIPTION OF THE DRAWING

The above and other objects, features and advantages will become more readily apparent from the following description, reference being made to the accompanying drawing in which:

FIG. 1 is a side elevational view of a portion of a chain of an assembly embodying the invention;

FIG. 2 is a side view of the assembly with offset pairs of running rollers;

FIG. 3 is a section taken along line A—A of FIG. 2 illustrating only one of the pairs of rollers and drawn to an enlarged scale;

FIG. 4 is a side elevational view of a portion of a pair of rollers showing the chain passing therearound; and FIG. 5 is a section through another mounting system for the axes of the rollers.

SPECIFIC DESCRIPTION

As can be seen from FIG. 1, an endless track for a track-laying vehicle comprises, as in shown at 1, a plurality of tread links 2 which are hingedly connected by intermediate links 3 and bolts or pins 4. The undersides of the tread links are formed with rubber cushions 5 while the upper surfaces form flat running surfaces for the road wheels which will be described subsequently.

Each pair of tread links 2 defines a gap 7 between them, this gap having a spacing x.

The assembly shown in FIG. 2 includes the chain 1 described in connection with FIG. 1, and here seen to be endless forming a running surface 6 upon which the wheels 8 roll. The assembly also includes a direction-change wheel 11 and upper support wheels 10 carrying the upper or return pass of the track.

The wheels 8 form part of bogie assemblies which support the vehicle chassis on the lower stretch of the tread which is driven by the drive sprocket 9 as described in the aforementioned publication.

A pair of the running wheels or rollers 8, which can have rubber tires 8a upon rims 8b of steel, are offset with an interaxial spacing X (FIG. 3). The interaxial spacing is formed by a pair of pins 20 and 21 projecting in opposite direction from each arm 12 and carrying the wheels via respective sets of bearings 8c. The axes 15 of the pins here have the offset X mentioned previously.

Two arms 12, each carrying a respective pair of wheels 8, are jointed in a rocker 13 whereby the arms are pivotally connected to a support arm 14 forming a crank which is connected by the usual spring and shock-absorber suspension to the vehicle chassis in a manner not shown.

The axes 15 of the wheels 8 all lie in a plane 16 parallel to the running surface 6.

In the embodiment of FIG. 5 the offset X is provided by having a single pin 15a traverse the arm 12a by mounting respective eccentric bushings 15b and 15b' upon this pin with the respective keys. The eccentric bushings 15b, 15b' form inner races of wheel bearings whose outer races are shown at 15c and 15c' and carry the respective wheels 18. The wheel supports in the embodiments of FIGS. 3 and 5 thus project from opposite sides from the arm 12 or 12a and cantilever the wheels thereon. The arrangements shown have been found to be particularly effective since they allow the wheels of each pair to lie especially close together or permit two pairs of rollers to be mounted on a common rocker with little space to accommodate the support arm.

As the wheel 8 roll upon the surface 6, the offset arrangement of the invention assures that always one of the wheels 8 of each pair will rest upon the flat surface of a tread link as has been shown in FIG. 4. Consequently, a drop in the pair of wheels as the links pass therearound is avoided. If, for example, the inner wheel (the one offset to the right in FIG. 4) lies at a gap between the tread links, the outer wheel remains fully perched upon the flat surface 6 of the next tread and prevents a drop of the wheels in the gap. Vertical oscillation because of the spacing between the links is eliminated.

While a result similar to that obtained with the present invention can be ensured by using offset tread links, i.e. tread links having one side of the tread offset by the distance X from the other side of the tread, this expedient has not been found to be as effective as the lateral offsetting of two rollers of a pair. Of course, two offset rollers can be used in combination with offset chain links if desired in which case the offsets are preferably in opposite directions so that, for example, the offset of the rollers can be (x/2) while the offset of the two sides of the tread links, likewise can be (x/2).

I claim:

1. In a track-laying military vehicle, the improvement which comprises track assembly having:

an endless track composed of a multiplicity of tread links spaced apart by linear gaps extending the width of the track and means pivotally connecting said links together only at the end of said gaps whereby said gaps each have a width x between respective tread links; and roller means supporting said track with a lower ground-engaging stretch and an upper return stretch, said roller means including an arm connected to said vehicle, and a pair of running wheels journaled on said arm and bearing upon running surfaces of said tread links at least in the region of said lower stretch, said wheels being journaled on said arm with an interaxial spacing X wherein $1x \leq X \leq 1.5x$, the axes of said wheels being fixed on the respective arm and lying in a plane parallel to the plane of said running surfaces of said lower stretch.

2. The assembly defined in claim 1 wherein said arm is formed with a pair of oppositely directed pins at an end of said arm, each of said pins defining a respective axis for one of said wheels, said pins being offset in a crank-shaft configuration.

3. The assembly defined in claim 1 wherein said arm is formed at said end with a throughgoing pin and each of said wheels is journaled on said arm by respective eccentric means mounted on said pin on a respective side of said arm and keyed to said pin.

4. The assembly defined in claim 1, claim 2 or claim 3 wherein said arm is connected to a further arm carrying a similar pair of wheels and forming a rocker with the first-mentioned arm, said vehicle being provided with a swingable support which is pivotally connected to said rocker.

5. The assembly defined in claim 4 wherein said vehicle is a tank and two such rockers, supports and pairs of wheels are provided in said roller means.

* * * * *